United States Patent [19]

Ivaschenko et al.

[11] Patent Number: 4,933,104
[45] Date of Patent: Jun. 12, 1990

[54] ANTHRAQUINONE DERIVATIVE AS A DICHROIC DYE FOR A LIQUID-CRYSTAL MATERIAL, LIQUID-CRYSTAL MATERIAL AND AN ELECTROOPTICAL DEVICE

[76] Inventors: Alexandr V. Ivaschenko, ultisa Pervomaiskaya, 44a, kv. 57; Valentina T. Lazareva, ulitsa Oktyabrskaya, 22, korpus 3, kv. 19; Elena K. Prudnikova, Likhachevskoe shosse, 20, kv. 29; Vladimir G. Rumyantsev, Likhachevskoe shosse, 20, korpus 1, kv. 165; Tamara S. Pljusnina, Likhachevskoe shosse, 20, kv. 22, all of Moskovskaya oblast, Dolgoprudny, U.S.S.R.

[21] Appl. No.: 240,130

[22] PCT Filed: Oct. 19, 1987

[86] PCT No.: PCT/SU87/00114

§ 371 Date: Jun. 8, 1988

§ 102(e) Date: Jun. 8, 1988

[87] PCT Pub. No.: WO88/03158

PCT Pub. Date: May 5, 1988

[30] Foreign Application Priority Data

Oct. 24, 1986 [SU] U.S.S.R. ................................ 4134106

[51] Int. Cl.$^5$ .................... C09K 19/00; G02F 1/13; C07C 103/75; C07C 50/36
[52] U.S. Cl. ........................ 252/299.1; 350/349; 544/294; 546/285; 549/373; 552/256
[58] Field of Search ................ 252/299.1; 350/349; 260/374, 377; 544/294; 546/285; 549/373

[56] References Cited

U.S. PATENT DOCUMENTS

| | | | |
|---|---|---|---|
| 4,136,100 | 1/1979 | Epple | 252/299.1 |
| 4,176,113 | 11/1979 | Wick et al. | 252/299.1 |
| 4,391,489 | 7/1983 | Harrison et al. | 252/299.1 |
| 4,530,572 | 7/1985 | Huffman | 252/299.1 |
| 4,702,561 | 10/1987 | Huffman | 252/299.1 |

FOREIGN PATENT DOCUMENTS

| | | | |
|---|---|---|---|
| 26004 | 4/1981 | European Pat. Off. | 252/299.1 |
| 57-90081 | 6/1982 | Japan | 252/299.1 |
| 57-121082 | 7/1982 | Japan | 252/299.1 |
| 1089084 | 6/1985 | U.S.S.R. | 252/299.1 |
| 1081890 | 9/1967 | United Kingdom | 252/299.1 |

OTHER PUBLICATIONS

Ivanshenko, A. V., et al., Mol. Cryst. Liq. Cryst., vol. 129, pp. 259–266 & 277–283, (1985).

Primary Examiner—Teddy S. Gron
Attorney, Agent, or Firm—Burgess, Ryan and Wayne

[57] ABSTRACT

A novel anthraquinone derivative is proposed, of the general formula

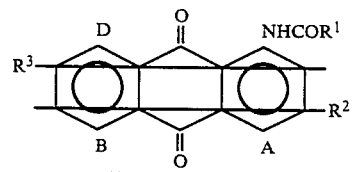

where A,B,D are simultaneously or independently groups —NHCOR$^1$, —NHCOAlk, —OCOAlk, —OCOR$^1$, —OH, —OAlk, —NHAlk, H, wherein R$^1$ is groups (Abstract continued on next page.)

-continued $R^4$ is groups where Alk=$C_1$-$C_{18}$;

$R^5$ is groups where Alk=$C_1$-$C_{18}$;
$R^6$ is hydrogen or —Alk=$C_1$-$C_8$;
$R^7$—Alkyl=$C_1$-$C_8$;
$R^2$, $R^3$ are groups —Alk, —OAlk, —SAlk,
where Alk=$C_1$-$C_8$ or $R^3$ - H, as a dichroic dye with negative dichrosim for a liquid-crystal material. Also proposed is a liquid-crystalline material containing a liquid-crystalline matrix and a dichroic dye representing at least one anthraquinone derivative of general formula /1/ taken in amount 1-15 mass %. An electrooptical device is proposed with a dichroic working body (1) made of said liquid-crystal material placed between transparent plates (2) on the inner sides of which electrodes (3) are located, fitted with conductors (6) connected to a power supply.

15 Claims, 1 Drawing Sheet

ANTHRAQUINONE DERIVATIVE AS A DICHROIC DYE FOR A LIQUID-CRYSTAL MATERIAL, LIQUID-CRYSTAL MATERIAL AND AN ELECTROOPTICAL DEVICE

FIELD OF THE ART

The present invention relates to dichroic dyes with negative dichroism and, more particularly, to a novel derivative of anthraquinone as a dichroic dye for a liquid-crystal material, liquid-crystal derivative and an electrooptical device.

PRIOR ART

Known in the art are anthraquinone derivatives (SU, A, No. 1089084) of the general formula where
R is 4-alkylphenyl, 4-(4'-alkylphenyl)phenyl, or trans-4-alkylcyclohexyl group;
A, B, D are —NHCOR, —OCOR, —OH, —OR$^1$, —NHR$^1$, or —NR$^1$R$^2$ group, and B and D can also be a hydrogen atom;
R$^1$ and R$^2$ represent an alkyl or alkylphenyl group, displaying negative dichroism in liquid crystals, a liquid-crystal material containing the above anthraquinone derivatives, and an electrooptical device based on the "guest-host" effect and containing this material as a working body.

The above anthraquinone derivatives in a liquid-crystal matrix ZK-807 based on 4-n-alkyl- and 4-n-alkoxy-4'-cyanobiphenyls has negative dichroism from −0.04 to −0.36 and a low limiting solubility in liquid crystals varying for the best samples from 0.1 to 2.3 mass %. In a liquid crystal 3010 ("La Roshe", Switzerland) the use of even a mixture of two dyes of the above formula does not produce the desired result since the total limiting solubility does not exceed 1.5 mass %. The liquid-crystal material containing (mass %) 0.1–2.5 anthraquinone derivative of the above formula and 97.6–99.9 crystal matrix has an optical density at the maximum of the long-wave absorption band equal to D$_1$=0.25–0.53. The electrooptical device based on the "guest-host" effect in which the above liquid-crystal material is used as a working body has an image luminance N=0.16–0.31. A low solubility of the described anthraquinone derivative does not allow one to obtain a liquid-crystal material with a high optical density (D$_1$) at the maximum of a long-wave absorption band and, correspondingly, an electrooptical device based on the "guest-host" effect with a high intensity of symbol coloration.

DISCLOSURE OF THE INVENTION

It is an object of the invention to design a novel anthraquinone derivative as a dichroic dye negative dichroism possessing a high solubility in a liquid-crystal matrix, a liquid-crystal material containing said dichroic dye and having a high optical density at the maximum of the long-wave absorption band, and electrooptical device based on the "guest-host" effect with the above liquid-crystal material as a dichroic working body and characterized by a high image luminance.

Said object is accomplished by that a novel anthraquinone derivative of the general formula is proposed

/1/ where A, B and D are simultaneously or independently —NHCOR$^1$, —NHCOAlk, — —OCOAlk, —OCOR$^1$, —OH, —OAlk, —NHAlk groups or H, where R$^1$ are the groups

R$^4$ are the groups

Alk— where Alk=C$_1$–C$_{18}$;
R$^5$ are the groups where Alk=C$_1$–C$_{18}$;

$R^6$ is hydrogen or $-Alk=C_1-C_8$;
$R^7$ is $Alk=C_1-C_8$;
$R^2$, $R^3$ are $-Alk$, $-OAlk$, $-SAlk$ groups,
where $Alk=C_1-C_8$ or $R^3$ is H as a dichroic dye with negative dichroism for a liquid-crystal material.

Also proposed is a liquid-crystal material containing a liquid-crystal matrix and a dichroic dye with negative dichroism, said liquid-crystal material, according to the invention, contains at least one anthraquinone derivative of general formula /1/ as a dichroic dye with negative dichroism.

To ensure a maximum optical density of the liquid-crystal material, it is expedient to have the content of the anthraquinone derivative of general formula /1/ 1-15 mass %.

The proposed anthraquinone derivative of general formula /1/, due to the structure, has a good solubility in liquid-crystal matrices (up to 15 mass %) and high dichroism (up to $S=-0.39$) which makes it possible to design a liquid-crystal material with a high optical density at a long-wave absorption band maximum.

The proposed liquid-crystal material provides the preparation of symbols of any color on a colorless or weakly-coloured background or on the background of any other colour with high gamma of the image in the corresponding electrooptical device.

Also proposed is an electrooptical device with a dichroic working body placed between transparent plates on the inner sides of which electrodes are located fitted with conductors connected to a power supply, wherein, according to the invention, the dichroic body is made of said liquid-crystal material.

The proposed electrooptical device for representation of alphanumeric information ensures the preparation of colored symbols and numeric symbols on a colored or weakly-colored background or on a background of any other color, the intensity of symbol color being much higher than that in the known electrooptical device ($N=0.94-12.0$).

Preferred Embodiment

The anthaquinone derivative of general formula /1/ is prepared from β-dialkylsubstituted 1,8-dioxy-4,5-diaminoanthraquinone or β-alkylsubstituted 1,4-diamino- or 1-amino-4-oxyanthraquinone by acylation with aromatic or cyclohexanecarboxylic acid chlorides and in some cases by amination.

The anthaquinone derivative of general formula /1/ prepared in such a way has in a liquid-crystalline matrix high negative dichroism (up to $S=-0.39$) and solubility (1-15 mass %) in liquid-crystalline mixtures exceeding 3-6 times the solubility of the above-described known anthraquinone derivatives.

A liquid-crystalline material is obtained by dissolution of 1-5 mass % of one or several anthraquinone derivatives of general formula /1/ in any liquid-crystal matrix being used (ZK-807, ZL-1840, 3010, ZK-1282, SP-586) upon heating to 60° C. and cooling to 20° C.

The used liquid-crystal matrix may possess positive or negative anisotropy and, if required, contain cholesteric liquid crystals and/or known dichroic dyes with positive dichroism.

The liquid-crystal material, according to the invention, has a high optical density at the maximum of a long-wave absorption band ($D_1=0.6-6.07$) exceeding greatly the optical density of the liquid-crystal material containing the above-described anthraquinone derivatives ($D_1=0.25-0.53$).

BRIEF DESCRIPTION OF THE DRAWING

A particular version of the accomplishment of the electroopitcal device, according to the invention, and the drawing (axial section) are given hereinbelow.

Figure 1:
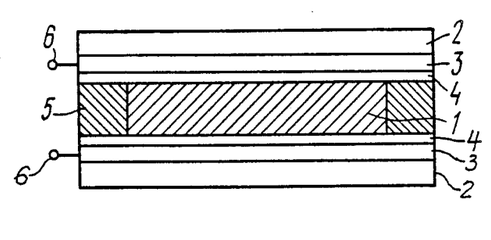

The electrooptical device consists of dichroic working body 1 in the form of a layer of a liquid-crystal material, said layer being located between two glass or any other optically transparent non-conducting plates 2 located one above the other and having transparent electrodes 3 with orienting layers 4. The thickness of the dichroic working body 1 with a preset orientation of molecules is determined by gaskets 5 located between the electrodes 3. The electrodes 3 on the inner surface of the plates are made in the form of certain symbols.

The electrodes 3 are fitted with conductors 6 connected to a power supply (not shown on the drawing).

The device operates in the following way. Voltage 5-10 V is delivered on the dichroic working body 1 through the electrodes 3 and the conductors 6 from the power supply. In the point of voltage delivery the molecular orientation of the working body changes and the initial colour thereof changes for the colour with $\lambda_{max}$ corresponding to the long-wave absorption band of the novel anthraquinone derivative of general formula /1/ included in the dichroic working body. The color intensity observed for different versions of the dichroic working body is shown in Table 7. A change in color is observed more vividly when polaroids are used.

The electrooptical device, according to the invention, operating on the "guest-host" effect with the use of the described liquid-crystal material has a high image luminance upon application of the electric field which is perceived visually rather well.

The specific examples of realizing the proposed invention, of which Examples 1-30 show the method of preparation and properties of the compounds of the general formula /1/ and Examples 31-64 describe the method of preparation and properties of the liquid-crystal material, are given hereinbelow by way of illustration.

EXAMPLE 1

1-Amino-4-octylamino-2-butylanthraquinone (0.4 g, 0.001 mole) and 4-octyl-biphenylcarboxylic acid chloride (0.37 g, 0.0012 mole) are refluxed in 20 ml chlorobenzene for 0.5 hr. The reaction mass is cooled to 20° C. and chromatographed with chloroform on Silica gel. 1,4-Bis(4-octylphenylbenzamido)-4-octylamino-2-butylanthraquinone is obtained in amount 0.36 g (51%). Found, %: C 80.91, H 8.28, N 4.20; $C_{47}H_{58}N_2O_3$. Calculated, %: C 80.76, H 8.36, N 4.00; $\lambda_{max}=555$ nm, $S=-0.21$, M.p.$=94°-95°$ C.

EXAMPLE 2

1,4-Diamino-2-butylanthraquinone (0.30 g, 0.001 mole) and p-butylbenzoic acid chloride (0.48 g, 0.0024 mole) are refluxed in 20 ml chlorobenzene for 0.5 hrs. The reaction mass is cooled to 20° C. and chromatographed with chloroform on Silica gel. 1,4-Bis(4-butylbenzamido)-2-butylanthraquinone is obtained in amount 0.36 g (60%). Found, %: C 76.74, H 8.31, N 4.53; $C_{40}H_{52}N_2O_4$. Calculated, %: C 76.89, H 8.39, N 4.48; $\lambda_{max}=475$ nm, $S=-0.22$. M.p.$=180°-181.3°$ C.

EXAMPLE 3

1,8-Diamino-3-methyl-4,5-dioxyanthraquinone (0.28 g, 0.001 mole) and 4-butylbenzoic acid chloride (1.18 g, 0.006 mole) are refluxed in 30 ml pyridine for 1 hr. The reaction mass is cooled to room temperature, poured into 100 ml of 5% HCl, and filtered. The precipitate is washed with water and dried. The obtained product is dissolved in chloroform and chromatographed with chloroform on Silica gel. 1,8Bis-(4-butylbenzamido)-4,5-bis-(4-butylbenzoyloxy)-3-methylanthraquinone is obtained in amount 0.44 g (55%). Found, %: C 76.61, H 6.41, N 2.98; $C_{59}H_{60}N_2O_8$. Calculated, %: C 76.60, H 6.54, N 3.03; $\lambda_{max}$ 465 nm, S=−0.34. M.p.>250° C.

EXAMPLES 4, 5

Compounds 4 and 5 are prepared in the same way as compound 3 described in Example 3.

EXAMPLE 6

1,8-Diamino-3,6-dibutyl-4,5-dioxyanthraquinone (0.38 g, 0.001 mole) and 4-butylbenzoic acid chloride (1.18 g, 0.006 mole) are refluxed in 30 ml pyridine for 1 hr. The reaction mass is cooled to room temperature, poured into 100 ml of 5% HCl, and filtered. The precipitate is washed with water and dried. The obtained product is dissolved in chloroform and chromatographed with chloroform on Silicd gel. 1,8-Bis-(4-butylbenzamido)-4,5-bis-(4.butylbenzoyloxy)-3,6-dibutylanthraquinone, m.p. 185°–186.5° C., is obtained in amount 0.55 g (54%). Found, %: C 77.33, H 7.13, N 2.59; $C_{66}H_{74}N_2O_8$. Calculated, %: C 77.46, H 7.29, N 2.74; $\lambda_{max}=468$ nm, S=−0.33.

EXAMPLES 7–14

Compounds 7–14 are obtained in the same way as compound 6 described in Example 6.

EXAMPLE 15

Under the conditions similar to those given in Example 3, 1,8-bis-(4-butylbenzamido)-4-(4-butylbenzoyloxy)-3-methyl-5-oxyanthraquinone (0.25 g, 44%) is prepared from 1,8-diamino-3-methyl-4,5-dioxyanthraquinone (0.28 g, 0.001 mole) and 4-p-butylbenzoic acid chloride (0.7 g, 0.0036 mole). Found, %: C 75.38, H 6.52, N 3.67; $C_{48}H_{48}N_2O_7$. Calculated, %: C 75.37, H 6.32, N 3.66; $\lambda_{max}=536$ nm, S=−0.32. M.p.=226.1°–228° C.

EXAMPLES 16, 17

Compounds 16 and 17 are prepared in the same way as compound 15 described in Example 15 under the conditions similar to those given in Example 3.

EXAMPLE 18

Under the conditions similar to those described in Example 6, 1,8-bis-(4-butylbenzamido)-4-(4-butylbenzoyloxy)-3,6-dibutyl-5-oxyanthraquinone (0.3 g, 43%), m.p.=146°–147.8° C., is obtained from 1,8-diamino-3,6-dibutyl-4,5-dioxyanthraquinone (0.38 g, 0.001 mole) and 4-p-n-butylbenzoic acid chloride (0.7 g, 0.0036 mole). Found, %: C 76.31, H 7.20, N 3.18; $C_{55}H_{62}N_2O_7$. Calculated, %: C 76.54, H 7.24, N 3.24; $\lambda_{max}=534$ nm, S=−0.31.

EXAMPLES 19–26

Compounds 19–26 are obtained in the same way as compound 18 described in Example 18 under the conditions similar to those given in Example 6.

EXAMPLE 27

1,8-Diamino-3-methyl-4,5-dioxyanthraquinone (0.28 g, 0.001 mole) and 4-(trans-4-amylcyclohexyl)benzoic acide chloride (0.73 g, 0.0025 mole) are refluxed in 20 ml chlorobenzene for 1 hr. The reaction mass is cooled to 60° C. and 30 ml ethanol is added upon stirring. The mixture is heated to the boiling point and then cooled to 20° C. The precipitate is filtered, washed with ethanol, dissolved in chloroform, and chromatographed with chloroform on Silica gel. 1,8-Bis-4-(trans-4-amylcyclohexyl)benzamido-3-methyl-4,5-dioxyanthraquinone is obtained in amount 0.42 g (64%). Found, %: C 77.32, H 7.14, N 3.58; $C_{51}H_{56}N_2O_6$. Calculated, %: C 77.24, H 7.12, N 3.53; m.p.>250° C.

EXAMPLE 28

Compound 28 is obtained in a similar way as compound 27 described in Example 27.

EXAMPLE 29

1,8-Bis-4-(trans-4-amylcyclohexyl)benzamido-3,6-dibutyl-4,5-dioxyanthraquinone (0.54 g, 60%), m.p. 217°–219° C., is prepared from 1,8-diamino-3,6-dibutyl-4,5-dioxyanthraquinone (0.38 l g, 0.001 mole) and 4-(trans-4-amylcyclohexyl)benzoic acid chloride (0.73 g, 0.0025 mole) under the conditions given in Example 27. Found, %: C 78.05, H 7.78, N 3.02; $C_{58}H_{70}N_2O_6$. Calculated, %: C 78.17, H 7.92, N 3.13.

EXAMPLE 30

Compound 30 is obtained in a similar way as compound 29 described in Example 29 under the conditions identical to those given in Example 27.

Table 1 given below lists the values of negative dichroism of the anthraquinone derivative of general formula /1/ for examples 1–30 in a liquid-crystalline mixture ZK-807; Table 2 illustrates physico-chemical characteristics, and Table 3—limiting solubility in liquid-crystalline mixtures (ZK-807, ZLI-1840, 3010, SP-586, ZK-1282) at 20° C.

TABLE 1

| No. of compound | $R^1$ | Position $R^2$ | $R^3$ | A |
|---|---|---|---|---|
| 1 | 2 | 3 | 4 | 5 |
| 1 | $C_8H_{17}$—⟨◯⟩—⟨◯⟩— | (2) $C_4H_9$ | H | —$NHC_8H_{17}$ |
| 2 | $C_4H_9$—⟨◯⟩— | (2) $C_4H_9$ | H | —NHCO—⟨◯⟩—$C_4H_9$ |

TABLE 1-continued

| | R¹ | (3) | | R² |
|---|---|---|---|---|
| 3 |  C₄H₉— | (3) CH₃ | H |  —OCO—⟨⟩—C₄H₉ |
| 4 |  C₅H₁₁—⟨H⟩—⟨⟩— | (3) CH₃ | H |  —OCO—⟨⟩—⟨H⟩—C₅H₁₁ |
| 5 |  C₆H₁₃—⟨H⟩— | (3) CH₃ | H |  —OCO—⟨H⟩—C₆H₁₃ |
| 6 |  C₄H₉—⟨⟩— | (3) C₄H₉ | (6) C₄H₉ |  —OCO—⟨⟩—C₄H₉ |
| 7 |  C₆H₁₃—⟨⟩— | (3) C₄H₉ | (6) C₄H₉ |  —OCO—⟨⟩—C₆H₁₃ |
| 8 |  C₅H₁₁—⟨H⟩—⟨⟩— | (3) C₄H₉ | (6) C₄H₉ |  —OCO—⟨⟩—⟨H⟩—C₅H₁₁ |
| 9 |  C₅H₁₁—⟨H⟩—⟨⟩— | (3) C₄H₉ | (6) C₄H₉ |  —OCO—⟨H⟩—C₄H₉ |
| 10 |  C₄H₉—⟨H⟩— | (3) C₄H₉ | (6) C₄H₉ |  —OCO—⟨⟩—⟨H⟩—C₄H₉ |
| 11 |  C₅H₁₁—⟨H⟩—⟨⟩— | (3) C₄H₉ | (6) C₄H₉ |  —OCO—⟨⟩—C₄H₉ |
| 12 |  C₅H₁₁—⟨H⟩—⟨⟩— | (3) C₄H₉ | (6) C₄H₉ | —OCO—C₃H₇ |
| 13 |  C₄H₉—⟨H⟩—⟨⟩— | (3) C₄H₉ | (6) C₄H₉ | —OCO—C₃H₇ |
| 14 |  C₄H₉—⟨⟩— | (3) C₅H₁₁ | (6) C₅H₁₁ |  —OCO—⟨⟩—C₄H₉ |
| 15 |  C₄H₉—⟨⟩— | (3) CH₃ | H | —OH |

TABLE 1-continued

| | Structure | | | |
|---|---|---|---|---|
| 16 | $C_6H_{13}$—[Cy-H]— | (3) $CH_3$ | H | —OH |
| 17 | $C_5H_{11}$—[Cy-H]—[Ph]— | (3) $CH_3$ | H | —OH |
| 18 | $C_4H_9$—[Ph]— | (3) $C_4H_9$ | (6) $C_4H_9$ | —OH |
| 19 | $C_5H_{11}$—[Cy-H]—[Ph]— | (3) $C_4H_9$ | (6) $C_4H_9$ | —OH |
| 20 | $C_6H_{13}$—[Cy-H]—[Pyr-N,Cl]— | (3) $C_4H_9$ | (6) $C_4H_9$ | —OH |
| 21 | $C_5H_{11}$—[Cy-H]—[Ph]— | (3) $C_4H_9$ | (6) $C_4H_9$ | —OH |
| 22 | $C_5H_{11}$—[Cy-H]—[Ph]— | (3) $C_4H_9$ | (6) $C_4H_9$ | —OH |
| 23 | $C_4H_9$—[Cy-H]—[Ph]— | (3) $C_4H_9$ | (6) $C_4H_9$ | —OH |
| 24 | $C_5H_{11}$—[Cy-H]—[Ph]— | (3) $C_4H_9$ | (7) $C_4H_9$ | —OH |
| 25 | $C_4H_9$—[Ph]— | (3) $C_5H_{11}$ | (6) $C_5H_{11}$ | —OH |
| 26 | $C_6H_{13}$—[Ph]— | (3) $C_5H_{11}$ | (6) $C_5H_{11}$ | —OH |
| 27 | $C_5H_{11}$—[Cy-H]—[Ph]— | (3) $CH_3$ | H | —OH |
| 28 | $C_5H_{11}$—[Cy-H]—[Ph]— | (3) $C_4H_9$ | H | —OH |

TABLE 1-continued

| No. | Structure | (3) | (6) | |
|---|---|---|---|---|
| 29 | C₅H₁₁–[H]–[phenyl]– | (3) C₄H₉ | (6) C₄H₉ | —OH |
| 30 | C₄H₉–[H]–[phenyl]– | (3) C₄H₉ | (6) C₄H₉ | —OH |

| No. of compound | B | D | S | $\lambda_{max}$, nm |
|---|---|---|---|---|
| 1 | H | H | −0.21 | 555 |
| 2 | H | H | −0.22 | 475 |
| 3 | —OCO–[phenyl]–C₄H₉ | —NHCO–[phenyl]–C₄H₉ | −0.34 | 465 |
| 4 | —OCO–[phenyl]–[H]–C₅H₁₁ | —NHCO–[phenyl]–[H]–C₅H₁₁ | −0.36 | 468 |
| 5 | —OCO–[H]–C₆H₁₃ | —NHCO–[H]–C₆H₁₃ | −0.37 | 461 |
| 6 | —OCO–[phenyl]–C₄H₉ | —NHCO–[phenyl]–C₄H₉ | −0.33 | 468 |
| 7 | —OCO–[phenyl]–C₆H₁₃ | —NHCO–[phenyl]–C₆H₁₃ | −0.26 | 434, 455 |
| 8 | —OCO–[phenyl]–[H]–C₅H₁₁ | —NHCO–[phenyl]–[H]–C₅H₁₁ | −0.38 | 466 |
| 9 | —OCO–[H]–C₄H₉ | —NHCO–[phenyl]–[H]–C₅H₁₁ | −0.38 | 475 |
| 10 | —OCO–[phenyl]–[H]–C₄H₉ | —NHCO–[H]–C₄H₉ | −0.35 | 466 |
| 11 | —OCO–[H]–C₄H₉ | —NHCO–[phenyl]–[H]–C₅H₁₁ | −0.36 | 470 |
| 12 | —OCO—C₃H₇ | —NHCO–[phenyl]–[H]–C₅H₁₁ | −0.35 | 473 |

TABLE 1-continued

| | | | | |
|---|---|---|---|---|
| 13 | —OCO—C₃H₇ |  | −0.37 | 470 |
| 14 |  |  | −0.32 | 458 470 |
| 15 |  |  | −0.32 | 536 |
| 16 |  |  | −0.32 | 536 |
| 17 |  |  | −0.38 | 540 |
| 18 |  |  | −0.31 | 534 |
| 19 |  |  | −0.38 | 540 |
| 20 |  |  | −0.33 | 534 |
| 21 |  |  | −0.37 | 542 |
| 22 | —OCO—C₃H₇ |  | −0.38 | 545 |
| 23 | —OCO—C₃H₇ |  | −0.36 | 542 |
| 24 |  |  | −0.33 | 563 617 |
| 25 |  |  | −0.30 | 540 |

TABLE 1-continued

| No. | Col A | Col B | value | num |
|---|---|---|---|---|
| 26 | —OCO—C₆H₄—C₆H₁₃ | —NHCO—C₆H₄—C₆H₁₃ | −0.31 | 542 |
| 27 | —OH | —NHCO—C₆H₄—[H]—C₅H₁₃ | −0.33 | 562 / 603 |
| 28 | —OH | —NHCO—C₆H₄—[H]—C₅H₁₁ | −0.32 | 564 / 605 |
| 29 | —OH | —NHCO—C₆H₄—[H]—C₅H₁₁ | −0.32 | 563 / 606 |
| 30 | —OH | —NHCO—C₆H₄—[H]—C₄H₉ | −0.34 | 566 / 608 |

TABLE 2

| No. of compound | M.P., °C. | Found, % C | Found, % H | Found, % N | Approximate formula |
|---|---|---|---|---|---|
| 1 | 94–95 | 80.91 | 8.28 | 3.92 | $C_{47}H_{58}N_2O_3$ |
| 2 | 180–181.3 | 76.74 | 8.31 | 4.53 | $C_{40}H_{52}N_2O_4$ |
| 3 | >250 | 76.61 | 6.41 | 2.98 | $C_{59}H_{60}N_2O_8$ |
| 4 | >250 | 80.17 | 7.94 | 2.17 | $C_{87}H_{100}N_2O_8$ |
| 5 | >250 | 76.21 | 8.72 | 2.61 | $C_{67}H_{92}N_2O_8$ |
| 6 | 185–186.5 | 77.33 | 7.13 | 2.59 | $C_{66}H_{74}N_2O_8$ |
| 7 | 190.1–191.8 | 78.28 | 7.81 | 2.36 | $C_{74}H_{90}N_2O_8$ |
| 8 | 251.2–253 | 80.64 | 8.29 | 2.12 | $C_{94}H_{114}N_2O_8$ |
| 9 | 231–233 | 78.67 | 8.42 | 2.17 | $C_{80}H_{102}N_2O_8$ |
| 10 | 206–207.5 | 78.65 | 8.37 | 2.37 | $C_{78}H_{98}N_2O_8$ |
| 11 | 228–229.7 | 79.21 | 7.94 | 2.19 | $C_{80}H_{94}N_2O_8$ |
| 12 | 212–214.1 | 76.92 | 8.12 | 2.69 | $C_{66}H_{82}N_2O_8$ |
| 13 | 210–211.8 | 76.54 | 7.81 | 2.67 | $C_{64}H_{78}N_2O_8$ |
| 14 | 181.5–182.7 | 77.63 | 7.51 | 2.59 | $C_{68}H_{78}N_2O_8$ |
| 15 | 226.1–228 | 75.38 | 6.52 | 3.67 | $C_{48}H_{48}N_2O_7$ |
| 16 | 216–217 | 73.87 | 8.95 | 3.24 | $C_{54}H_{72}N_2O_7$ |
| 17 | >250 | 79.18 | 7.28 | 2.69 | $C_{69}H_{78}N_2O_7$ |
| 18 | 146–147.8 | 76.31 | 7.20 | 3.18 | $C_{55}H_{62}N_2O_7$ |
| 19 | 231–232.5 | 79.52 | 7.89 | 2.41 | $C_{76}H_{92}N_2O_7$ |
| 20 | >250 | 70.48 | 7.05 | 5.39 | $C_{76}H_{92}Cl_3N_5O_7$ |
| 21 | 212.5–214.6 | 78.41 | 8.07 | 2.38 | $C_{69}H_{86}N_2O_7$ |
| 22 | 207.3–209 | 77.43 | 7.81 | 2.80 | $C_{62}H_{76}N_2O_7$ |
| 23 | 203–204.8 | 77.28 | 7.59 | 2.97 | $C_{60}H_{72}N_2O_7$ |
| 24 | 244–245.2 | 79.90 | 8.17 | 2.39 | $C_{76}H_{92}N_2O_7$ |
| 25 | 156.2–157.8 | 76.91 | 7.48 | 3.19 | $C_{57}H_{66}N_2O_7$ |
| 26 | 158–160.2 | 77.51 | 8.14 | 2.63 | $C_{63}H_{78}N_2O_7$ |
| 27 | >250 | 77.32 | 7.14 | 3.58 | $C_{51}H_{56}N_2O_6$ |
| 28 | 248–249 | 77.52 | 7.41 | 3.32 | $C_{54}H_{62}N_2O_6$ |
| 29 | 217–219 | 78.05 | 7.78 | 3.02 | $C_{58}H_{70}N_2O_6$ |
| 30 | 223–225 | 77.86 | 7.64 | 3.19 | $C_{56}H_{66}N_2O_6$ |

| No. of compound | Calculated, % C | Calculated, % H | Calculated, % N | Yield, % |
|---|---|---|---|---|
| 1 | 80.76 | 8.36 | 4.00 | 51 |
| 2 | 76.89 | 8.39 | 4.48 | 60 |
| 3 | 76.60 | 6.54 | 3.03 | 55 |
| 4 | 80.27 | 7.74 | 2.15 | 50 |
| 5 | 76.39 | 8.80 | 2.67 | 52 |
| 6 | 77.46 | 7.29 | 2.74 | 54 |
| 7 | 78.26 | 7.99 | 2.47 | 54 |
| 8 | 80.65 | 8.21 | 2.00 | 52 |
| 9 | 78.78 | 8.43 | 2.30 | 50 |
| 10 | 78.62 | 8.29 | 2.35 | 50 |
| 11 | 79.30 | 7.82 | 2.31 | 51 |
| 12 | 76.86 | 8.01 | 2.72 | 49 |
| 13 | 76.62 | 7.84 | 2.79 | 49 |
| 14 | 77.68 | 7.48 | 2.66 | 53 |
| 15 | 75.37 | 6.32 | 3.66 | 44 |
| 16 | 73.99 | 8.88 | 3.43 | 42 |
| 17 | 79.13 | 7.51 | 2.67 | 39 |
| 18 | 76.54 | 7.24 | 3.24 | 43 |
| 19 | 79.68 | 8.09 | 2.44 | 44 |
| 20 | 70.55 | 7.17 | 5.41 | 38 |
| 21 | 78.52 | 8.22 | 2.65 | 36 |
| 22 | 77.46 | 7.97 | 2.91 | 38 |
| 23 | 77.22 | 7.78 | 3.00 | 38 |
| 24 | 79.68 | 8.09 | 2.44 | 43 |
| 25 | 76.82 | 7.46 | 3.14 | 44 |
| 26 | 77.58 | 8.06 | 2.87 | 44 |
| 27 | 77.24 | 7.12 | 3.53 | 64 |
| 28 | 77.67 | 7.48 | 3.35 | 65 |
| 29 | 78.17 | 7.92 | 3.14 | 54 |
| 30 | 77.92 | 7.71 | 3.24 | 53 |

Found, %: Cl - 8.37
Calculated, %: Cl - 8.22

TABLE 3

| No. of compound | Solubility, mass % ZK-807 | ZLI-1840 | 3010 | ZK-1282 | SP-586 |
|---|---|---|---|---|---|
| 1 | 2.0 | — | — | — | — |
| 2 | 4.0 | 3.6 | — | — | 2.9 |
| 3 | 5.0 | 1.0 | 1.1 | — | 2.0 |
| 4 | 1.0 | 1.5 | 3.0 | — | 1.9 |
| 5 | 3.0 | — | 1.0 | — | — |
| 6 | 9.0 | — | 4.6 | 4.0 | 4.0 |
| 7 | 5.0 | — | — | — | — |
| 8 | 11.0 | 5.7 | 2.6 | 1.8 | — |
| 9 | 9.0 | 7.7 | 9.0 | — | — |
| 10 | 10.8 | 7.2 | 9.0 | — | 7.5 |
| 11 | 9.0 | 4.0 | 4.5 | 4.2 | — |
| 12 | 5.2 | — | 1.82 | — | — |
| 13 | 4.9 | 2.1 | 1.75 | — | — |
| 14 | 9.5 | 3.8 | 4.46 | 4.0 | 3.78 |
| 15 | 1.0 | 0.6 | — | — | — |
| 16 | 1.5 | 0.7 | 0.7 | — | 0.6 |
| 17 | — | 0.7 | 1.2 | 0.7 | — |
| 18 | 2.7 | — | 0.7 | — | — |
| 19 | — | 2.5 | 4.8 | — | 2.9 |
| 20 | 1.2 | 0.7 | 0.75 | — | — |
| 21 | — | 3.0 | 3.3 | 2.7 | — |
| 22 | 1.1 | 1.4 | 2.0 | 1.5 | 1.2 |

TABLE 3-continued

| No. of compound | Solubility, mass % | | | | |
|---|---|---|---|---|---|
| | ZK-807 | ZLI-1840 | 3010 | ZK-1282 | SP-586 |
| 23 | 1.7 | 2.6 | 2.0 | — | — |
| 24 | 6.0 | 5.5 | 6.0 | — | — |
| 9–8 + 6–7 | 15.0 | — | 12.7 | — | — |
| 25 | 3.0 | 1.0 | 0.9 | — | — |
| 26 | 2.9 | 1.1 | 1.0 | 0.7 | — |
| 27 | 1.0 | 1.0 | 1.0 | 1.0 | — |
| 28 | 0.6 | 1.0 | 1.1 | 1.0 | 0.8 |
| 29 | 1.0 | 1.0 | 1.0 | 1.0 | — |

EXAMPLES 31–64

A weighed sample of one or several anthraquinone derivatives of general formula /1/ is dissolved upon heating to 60° C. in a liquid-crystal matrix and then cooled to 20° C. A liquid-crystal material is obtained. Compositions of the materials and their optical densities at the maximum of a long-wave absorption band are given in Table 4.

TABLE 4

| No. of example | The dye from Table 1 and content thereof, mass % | | Liquid crystal matrix and content thereof, mass % | | $\lambda_{max}$, nm | Optical density $D_1$ for a layer of liquid-crystal material 20 μm thick |
|---|---|---|---|---|---|---|
| 1 | 2 | 3 | 4 | 5 | 6 | 7 |
| 31 | 2 | 4 | K-807 | 96 | 475 | 0.57 |
| 32 | 1 | 3 | K-807 | 97 | 554 | 1.21 |
| 33 | 3 | 5 | K-807 | 95 | 465 | 2.03 |
| 34 | 3 | 2 | K-807 | 98 | 466 | 0.81 |
| 35 | 6 | 2 | 3010 | 98 | 466 | 0.83 |
| 36 | 6 | 9 | K-807 | 91 | 468 | 3.60 |
| 37 | 6 | 4 | SP-586 | 96 | 466 | 1.62 |
| 38 | 6 | 4 | K-1282 | 96 | 468 | 1.61 |
| 39 | 6 | 4.6 | 3010 | 95.4 | 466 | 1.71 |
| 40 | 5 | 3 | K-807 | 97 | 461 | 1.29 |
| 41 | 4 | 3.0 | K-807 | 97 | 468 | 1.20 |
| 42 | 4 | 3.0 | 3010 | 97 | 467 | 1.23 |
| 43 | 8 | 5.7 | ZLI-1840 | 94.3 | 467 | 2.28 |
| 44 | 8 | 2.6 | 3010 | 97.4 | 468 | 1.04 |
| 45 | 8 | 1.8 | K-1282 | 98.2 | 466 | 0.8 |
| 46 | 8 | 5.0 | K-807 | 95 | 466 | 1.98 |
| 47 | 18 | 5.0 | K-807 | 95 | 537 | 2.03 |
| 48 | 16 | 2.0 | K-807 | 98 | 538 | 0.82 |
| 49 | 19 | 2.5 | ZLI-1840 | 97.5 | 535 | 1.04 |
| 50 | 19 | 4.8 | 3010 | 95.2 | 535 | 1.62 |
| 51 | 29 | 1 | K-807 | 99 | 606 | 0.54 |
| 52 | 27 | 1 | ZK-807 | 99.0 | 603 | 0.58 |
| 53 mixture | 6 + 9 | 8.0 + 7.0 = 15 | ZK-807 | 85.0 | 464 | 6.07 |
| 54 | 7 | 4.0 | 3010 | 96.0 | 467 | 1.65 |
| 55 | 10 | 5.8 | ZLI-1840 | 94.2 | 466 | 2.36 |
| 56 mixture | 11 + 13 | 6.1 + 2.0 = 8.1 | ZK-807 | 91.9 | 470 | 3.48 |
| 57 mixture | 12 + 16 | 2.0 + 1.8 = 3.8 | ZK-807 | 96.2 | 472 | 1.52 |
| 58 | 14 | 90 | ZK-807 | 91 | 466 | 3.6 |
| 59 mixture | 15 + 16 | 0.7 + 1.2 = 1.9 | 3010 | 98.1 | 536 | 0.76 |
| 60 | 20 | 1.0 | ZK-807 | 99 | 534 | 0.68 |
| 61 mixture | 24 + 28 | 3.2 + 3.0 = 6.2 | 3010 | 93.8 | 563 | 2.15 |
| 62 mixture | 22 + 23 | 1.2 + 0.8 = 2.0 | ZLI-1840 | 96.1 | 617 543 | 1.82 |
| 63 mixture | 17 + 21 | 1.0 + 0.9 = 1.9 | ZK-807 | 95.3 | 540 | 1.55 |
| 64 | 30 | 1.0 | 3010 | 99.0 | 564 606 | 1.32 |

Table 5 below shows the parameters with respect to the intensity of colour of symbols (electrodes 3) in an electrooptical device for representation of information, according to the invention. For the sake of comparison also given are the parameters of anthraquinone derivatives according to SU, A, No. 1089084, in Table 6 with respect to the limiting solubility in liquid-crystal mixtures ZK-807, ZLI-1840 at 20° C., in Table 7 with respect to the optical density of the liquid-crystal material containing one of these derivatives and to the intensity of colour of the symbols of the electrooptical device with a dichroic working body made of the above material 20 μm thick.

TABLE 5

| No. of examples | Liquid-crystal material, according to Example | Intensity $N = D_1-D_{11}$ |
|---|---|---|
| 65 | 31 | 0.94 |
| 66 | 32 | 1.64 |
| 67 | 33 | 3.57 |
| 68 | 34 | 1.45 |
| 69 | 35 | 1.47 |
| 70 | 36 | 7.20 |
| 71 | 37 | 3.20 |
| 72 | 38 | 3.20 |
| 73 | 39 | 3.42 |
| 74 | 40 | 2.12 |
| 75 | 41 | 2.68 |

TABLE 5-continued

| No. of examples | Liquid-crystal material, according to Example | Intensity N = $D_1$-$D_{11}$ |
|---|---|---|
| 76 | 42 | 1.68 |
| 77 | 43 | 4.56 |
| 78 | 44 | 2.08 |
| 79 | 45 | 4.00 |
| 80 | 46 | 4.54 |
| 81 | 47 | 5.05 |
| 82 | 48 | 1.60 |
| 83 | 49 | 2.00 |
| 84 | 50 | 3.60 |
| 85 | 51 | 1.73 |
| 86 | 52 | 1.94 |
| 87 | 53 | 12.0 |
| 88 | 54 | 3.2 |
| 89 | 55 | 4.72 |
| 90 | 56 | 4.78 |
| 91 | 57 | 3.04 |
| 92 | 58 | 7.20 |
| 93 | 59 | 1.52 |
| 94 | 60 | 1.37 |
| 95 | 61 | 4.29 |
| 96 | 62 | 2.27 |
| 97 | 63 | 3.09 |
| 98 | 64 | 1.87 |

TABLE 6

| No. 1 | R 2 | A 3 | B 4 |
|---|---|---|---|
| 1 | $C_8H_{17}$—⌬—⌬— | $C_4H_9HN$— | H— |
| 2 | $C_5H_{11}$—⌬—⌬— | $C_4H_9HN$— | H— |
| 3 | $C_4H_9$—⌬— | $C_4H_9$—⌬—CONH— | H— |
| 4 | $C_6H_{13}$—⌬— | $C_6H_{13}$—⌬—CONH— | H— |
| 5 | $C_6H_{13}$—⌬— | $C_6H_{13}$—⌬—COO— | $C_6H_{13}$—⌬—COO |
| 6 | $C_4H_9$—⌬— | $C_4H_9$—⌬—COO— | $C_4H_9$—⌬—COO |
| 7 | $C_4H_9$—⌬— | HO— | HO— |
| 8 | $C_4H_9$—⌬— | HO— | $C_4H_9$—⌬—COO— |
| 9 | $C_6H_{13}$—⌬— | HO— | HO— |
| 10 | $C_5H_{11}$—⬡(H)—⌬— | HO— | $C_5H_{11}$—⬡(H)—⌬—COO— |

TABLE 6-continued

| No. | D5 | Solubility, mass % ZK-807 | Solubility, mass % ZLI-1840 |
|---|---|---|---|
| 11 |  HO— | | |
| 12 |  | | |
| 1 | H— | 0.8 | 0.4 |
| 2 | H— | 0.9 | 0.5 |
| 3 | H— | 2.0 | 0.3 |
| 4 | H— | 2.3 | 0.6 |
| 5 |  | 0.5 | 0.1 |
| 6 |  | 0.5 | — |
| 7 |  | 0.1 | — |
| 8 |  | 1.0 | 0.3 |
| 9 |  | 0.1 | — |
| 10 |  | 0.2 | 0.6 |
| 11 |  | 0.08 | 0.1 |
| 12 |  | 0.4 | 0.5 |

TABLE 7

| No. of dye from Table 1 | $\lambda_{max}$, nm | Optical density $D_1$ | Intensity $N = D_1 - D_{11}$ |
|---|---|---|---|
| 1 | 580,617 | 0.25 | 0.16 |
| 2 | 580,617 | 0.23 | 0.18 |
| 3 | 508 | 0.35 | 0.23 |
| 4 | 512 | 0.36 | 0.25 |
| 5 | 468 | 0.28 | 0.19 |
| 6 | 470 | 0.28 | 0.21 |
| 7 | 560 | 0.34 | 0.27 |
| 8 | 535 | 0.36 | 0.27 |
| 9 | 562 | 0.33 | 0.26 |
| 10 | 554 | 0.35 | 0.26 |
| 11 | 562 | 0.31 | 0.25 |
| 12 | 470 | 0.29 | 0.21 |

A comparison of the parameters of best representatives of anthraquinone derivatives, according to SU, A, No. 1089084, with anthraquinone derivatives of general formula /1/, according to the invention, points to the fact that the latters are most effective dichroic dyes exhibiting negative dichroism in liquid crystals. Their solubility exceeds many times that of known derivatives. For instance, solubility of dye No. 2 (Table 3) in ZK-807 exceeds 2.5 times the solubility of the analogue thereof (No. 1, Table 6). The solubility of dye No. 7 (Table 3) in the same mixture exceeds 10 times the solubility of the analogue thereof (No. 5, Table 6). The solubility of dye No. 6 (Table 3) exceeds 18 times the solubility of the analogue thereof (No. 6, Table 6).

Thus, as is seen from Tables 4 and 7, liquid-crystal materials including the proposed compounds of formula /1/ have at the long-wave absorption band maximum the optical density ($D_1=0.54-6.07$) exceeding 2.2–11.5 times the optical density of the compounds according to SU, A, No. 1089084 ($D_1=0.25-0.53$).

The electrooptical device, according to the invention, makes it possible to represent information with a higher color intensity of symbols than in the known device. Tables 4 and 7 show that the color intensity of symbols of the proposed electrooptical device ($N=0.94-12.0$) exceeds 5.9–38.7 times the color intensity of symbols of the known device ($N=0.16-0.31$).

INDUSTRIAL APPLICABILITY

An electrooptical device with a dichroic working body from a liquid-crystal material containing the anthraquinone derivative of general formula /1/ as a dichroic dye with negative dichroism will find wide application in the electronic industry for representation of alphanumeric information in, for instance, electronic time pieces, microcalculators, control panels of cars.

We claim:

1. An anthraquinone derivative of the formula where A, B, D simultaneously or independently represent, —NHCOR$^1$, —NHCOAlk, —OCOAlk, —OCOR$^1$, —OH, —OAlk, —NHAlk or H, wherein R$^1$ represents R$^4$ represents —Alk represents
where Alky C$_1$–C$_{18}$;
R$^5$ represents where Alk=C$_1$–C$_{18}$;
R$^6$ represents hydrogen or C$_1$–C$_8$ alkyl;
R$^7$ represents C$_1$–C$_8$ alkyl;
R$^2$ represents C$_1$–C$_8$ alkyl, in the 2 or 3 position;
R$^3$ represents hydrogen or C$_1$–C$_8$ alkyl in the 6 or 7 position, as a dichroic dye with negative dichroism for a liquid cyrstal material.

2. A liquid-crystal material containing a liquid-crystal matrix and a dichroic dye with negative dichroism, characterized in that as a dichroic dye with negative dichroism comprises at least one anthraquinone derivative of general formula /1/ as claimed in claim 1.

3. A liquid-crystal material as claimed in claim 2, characterized in that the content of the anthraquinone derivative of general formula /1/ is 1–15 mass %.

4. An electrooptical device with a dichroic working body placed between transparent plates on the inner sides of which electrodes are located, fitted with conductors connected to a power supply, characterized in that the dichroic working body is made of a liquid-crystal material according to claims 2 or 3.

5. A compound of claim 1, wherein R$^1$ is

-continued

6. A compound of claim 1, wherein $R^1$ is

7. A compound of claim 1, wherein a is

8. A compound of claim 1, wherein A is —NHAlk; B is H; D is H; $R^1$ is and $R^3$ is H.

9. A compound of claim 1, wherein A is

B is H; D is H; $R^1$ is and $R^3$ is H.

10. The anthraquinone derivative of claim 1 having the formula:

wherein $R^1$, $R^4$, $R^5$ and $R^6$ are the same as in claim 1; $R^2$ and $R^7$ represent $C_1-C_8$ alkyl; A represents —NHAlk wherein Alk is $C_1-C_8$ alkyl; and B and D represent hydrogen.

11. The anthraquinone derivative of claim 1 having the formula wherein $R^1$, $R^4$, $R^5$ and $R^6$ are the same as in claim 1; $R^2$ and $R^7$ represent $C_1-C_8$ alkyl; A represents —NHCOR$^1$; and B and D represent hydrogen.

12. The anthraquinone derivative of claim 1 having the formula:

wherein $R^1$, $R^4$, $R^5$ and $R^6$ are the same as in claim 1; $R^2$ and $R^7$ represent $C_1-C_8$ alkyl; $R^3$ represents hydrogen or $C_1-C_8$ alkyl; and A and B represent OCOAlk or OCOR$^1$; and D represents NHCOR$^1$.

13. The anthraquinone derivative of claim 1 having the formula:

wherein $R^1$, $R^4$, $R^5$ and $R^6$ are the same as in claim 1; $R^2$, $R^3$ and $R^7$ represent $C_1$-$C_8$ alkyl; A represents —OCOAlk or —OCOR$^1$; B represents —OH; and D represents —NHCOR$^1$.

14. The anthraquinone derivative of claim 1 having the formula:

wherein $R^1$, $R^4$, $R^5$ and $R^6$ are the same as in claim 1; $R^2$, $R^3$ and $R^7$ represent $C_1$-$C_8$ alkyl; A represents —OCOAlk or —OCOR$^1$; B represents —NHCOR$^1$; and D represents —OH.

15. The anthraquinone derivative of claim 1 having the formula wherein $R^1$, $R^4$, $R^5$ and $R^6$ are the same as in claim 1; $R^2$ and $R^7$ represent $C_1$-$C_8$ alkyl; $R^3$ represents hydrogen or $C_1$-$C_8$ alkyl; A and B represent —OH; and D represents —NHCOR$^1$.

* * * * *